United States Patent [19]

Berger

[11] 3,866,189

[45] Feb. 11, 1975

[54] RECORDING AND PLAYBACK DEVICE WITHOUT MOVING PARTS

[76] Inventor: Judo Lewis Berger, 8614 Camden St., Alexandria, Va. 22308

[22] Filed: Feb. 16, 1973

[21] Appl. No.: 333,235

[52] U.S. Cl. .......... 340/173.2, 333/29

[51] Int. Cl. .......... G11c 11/22

[58] Field of Search .......... 340/173.2, 173 R; 333/29, 333/30

[56] References Cited

UNITED STATES PATENTS

| | | | |
|---|---|---|---|
| 2,924,814 | 2/1960 | Simpson | 340/173.2 |
| 2,984,825 | 5/1961 | Fuller | 340/174 R |
| 3,320,596 | 5/1967 | Smith | 340/173 R |

*Primary Examiner*—Terrell W. Fears
*Attorney, Agent, or Firm*—Eugene E. Stevens, III; Frank J. Dynda; Glenn S. Ovrevik

[57] ABSTRACT

A recording and playback device utilizing a ferroelectric capacitor or a saturable ferromagnetic reactor is disclosed. The ferroelectric capacitor or saturable ferromagnetic reactor is so designed as to saturate in different physical areas with a different applied voltage or current, respectively. This selective area of saturation can be accomplished by utilizing, in the case of a ferroelectric capacitor, a wedge-shaped thickness of dielectric; and in the case of the saturable ferromagnetic reactor, by using a wedge-shaped or other non-uniform cross sectional area of core material. The recording and playback are both accomplished by utilizing simple electronic circuitry in connection with the ferroelectric capacitor or saturable ferromagnetic reactor.

6 Claims, 29 Drawing Figures

RECORDING AND PLAYBACK DEVICE WITHOUT MOVING PARTS

The invention described herein may be manufactured and used by or for the Government for Governmental purposes without the payment to me of any royalties thereon.

BACKGROUND OF THE INVENTION

This invention relates to recording and playback devices and more specifically to such devices that do not utilize or need moving parts, such as are conventionally used with recording and playback devices.

The recording industry for many years has been dependent for its recording and reproducing devices on moving mechanical parts, for example, motors, capstands, etc. These parts, when used in recording devices, transport the recording medium such as tape, wire, or phonograph record, over the recording head, and when used as reproducing devices, are used to transport the recorded medium over the reproducing head.

These tape, wire, and phonograph recording playback devices are of course used extensively today and in most cases are more than adequate for the purpose intended. However, these devices are subject to mechanical wear, require a large amount of volume to house the motor, gearing, etc., generally require a high power source to operate the mechanical devices, and do not lend themselves to recording of small quantities of information, since there is no attendant decrease in mechanical complexity.

To overcome or circumvent the above mentioned problems that are inherent in all tape, wire, or phonograph record devices, various other memory and readout devices, such as magnetic and ferroelectric matrices have been devised. Unfortunately, these devices also have their attendent disadvantages. For example, the addressing of one of many cores or matrices requires the use of many transistors, diodes, etc.; the amount of information that can be stored per unit volume, although quickly available, is much less than in a phonograph or tape recorder of similar volume; and, the possibility of analog storage is considered far too expensive for matrix type memory as the area per bit of information is relatively large.

From the foregoing remarks, it is obvious that a need exists in the art for a small, light weight recording and reproducing system, with no mechanical parts. Further, such a device should be capable of both analog and digital recording. This invention provides a small, light weight recording and reproducing system that has no mechanical parts and is capable of both analog and digital recording.

SUMMARY OF THE INVENTION

Recording and playback devices designed in accordance with this invention utilize a saturable ferroelectric capacitor or a saturable ferromagnetic reactor as the storage medium. The capacitor or reactor is so designed physically as to saturate in different physical areas with a different applied voltage or current, respectively. The material used for the dielectric in the ferroelectric capacitor species of the invention, or the material used for the saturable core material in the ferromagnetic reactor embodiment of the invention, are so fabricated as to have a non-uniform cross sectional area. While any one of several different shapes may be utilized for the dielectric or core material, a wedge-shape has been found to be ideally suited for use in accordance with this invention. Thus, in the case of the ferroelectric capacitor, a wedge-shape thickness of dielectric is used and in the case of the ferromagnetic reactor, a wedge-shape thickness of saturable core material has been utilized.

By using a ferroelectric or ferromagnetic material of non-uniform thickness, the saturable device can be selectively brought out of saturation in different areas along its length. This is accomplished by utilizing a descending voltage or current bias. The information to be recorded is caused to gate or modulate the amplitude of this descending bias on the saturable device. At the higher values of bias, the thicker portions of the saturable material are brought out of saturation. As the bias decreases the thinner portions of the saturable material are brought out of saturation but the thicker portions are not affected because the lesser value of bias and signal is insufficient to alter the polarization or the magnetization of the ferroelectric capacitor or ferromagnetic reactor, respectively. Thus, in the record mode, one starts with a high bias voltage which brings the thicker portions of the saturable material out of saturation and then decreases the bias to bring newer areas or domains out of saturation without affecting the thicker portions, since the combination of bias and signal at the lower bias level is insufficient to alter the polarization or magnetization of the saturable material. Relatively simple electronic circuitry is utilized to generate the bias necessary for recording information on the ferroelectric or ferromagnetic storage device.

After the information has been stored on the recording medium of this invention, it will remain stored indefinitely unless a voltage or current is applied to the saturable device that alters the polarization or magnetization, as the case may be, or unless the information is specifically readout in accordance with this invention. As was the case with recording, readout of the information stored on a storage medium designed in accordance with this invention is accomplished by means of simple electronic circuitry. Instead of a descending bias voltage, an ascending bias voltage is applied in the readout mode. In the readout mode, readout then takes place from the thin end of the saturable device to the thicker end of the device due to the ascending bias voltage. As will be apparent later, readout must take place from the thin end to the thick end in order to prevent destruction of the information stored. Since readout is from the thin end towards the thick end of the storage device and recording was from the thick end towards the thin end of the storage medium, the information will be readout backwards. In the case of digital recording, this presents no problem, but in the case of the recording of speech signals, this reversal renders the information unintelligible on a direct readout. This problem is easily overcome by reading out the speech signals from the original storage device and storing it on a second storage device and then reading out the information from the second storage device. Since the information is reversed as it is readout from the first storage device, it is applied or stored on the second storage device in this reverse direction. Readout then from the second storage device will provide the information in proper order.

When the information is readout from a storage device designed in accordance with this invention, the readout is destructive. That is information is totally readout and no longer stored on the storage medium. Permanent storage, however, can be obtained by simultaneously storing the information during readout on a second storage device designed in accordance with this invention. Thus, the information is restored while it is readout. In this way permanent storage of the information can be obtained. Since the overall electronic circuitry of this invention is relatively simple, the necessity of restoring the information during readout to prevent destruction of the information does not greatly increase the complexity of the overall system.

Since the recording and playback system of this invention does not have any mechanical moving parts as is the case in the conventional recording and playback devices, there are no mechanical parts subject to wear and deterioration. Further, recording and playback systems designed in accordance with this invention are relatively small and compact since no mechanical parts, such as motors and the like, are needed and therefore the high voltage needed to drive these devices is not needed with recording and playback systems of this invention. Thus, a great deal of information can be stored and retrieved on a relatively small device.

It is therefore an object of this invention to provide a recording and playback system.

It is another object of this invention to provide a recording and playback device that does not have the moving parts conventionally associated with such devices.

It is still another object of this invention to provide a recording and playback system utilizing a ferroelectric capacitor as the storage medium.

It is a further object of this invention to provide a recording and playback system utilizing a saturable ferromagnetic reactor as the storage medium.

It is still a further object of this invention to provide a recording and playback system for digital or analog signals that utilizes a ferroelectric capacitor as the storage medium.

It is yet a further object of this invention to provide a recording and playback system for digital or analog signals that utilizes a saturable ferromagnetic reactor as the storage medium.

BRIEF DESCRIPTION OF THE DRAWINGS

The above mentioned and other objects of this invention will become readily apparent from the following detailed description when read in conjunction with the annexed drawings in which.

DESCRIPTION OF THE INVENTION

Figures 1, 2, 3:
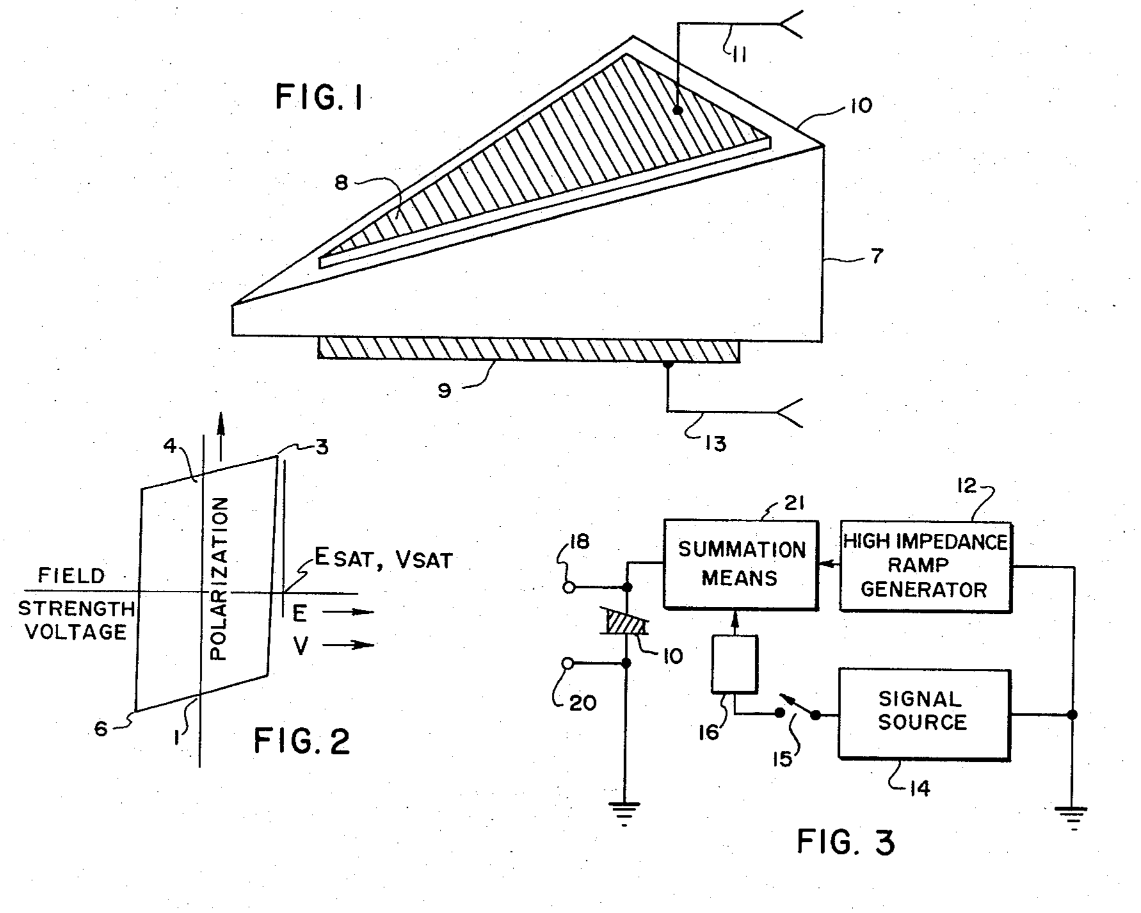
FIG. 1 shows a storage device constructed in accordance with this invention.
FIG. 2 shows a typical hysteresis loop for the storage device of FIG. 1.
FIG. 3 shows a record and playback system designed in accordance with this invention.

As mentioned above, the storage medium of a recording and playback system of this invention is either a ferroelectric capacitor having a dielectric of a nonuniform cross section or a saturable ferromagnetic reactor having a core material of nonuniform cross section. Either of the two devices when used in accordance with this invention operate in essentially the same manner. However, for purposes of clarity and ease of description, the invention will be described with reference to a ferroelectric capacitor. Thus, FIG. 1 shows a ferroelectric capacitor 10 having a wedge shaped dielectric 7 wedge shaped plates 8 and 9. The leads 11 and 13 are attached to capacitor plates 8 and 9. Capacitor plates 8 and 9 are wedge shaped to provide a uniform capacitance along the length of ferroelectric capacitor 10. A wedge shaped device as shown in FIG. 1 is ideally suited for use in accordance with this invention. In the case of a saturable ferromagnetic reactor, the saturable core material would be wedge shaped. It is to be remembered, however, that while the wedge shape is ideally suitable, any suitable nonuniform shape can be used.

FIG. 2 shows a typical loop of polarization P (or displacement) versus field strength E, or voltage V for the ferroelectric capacitor of FIG. 1. Before continuing with the description of the invention, some general observations should be made about ferroelectric capacitor 10 to facilitate a fuller understanding of the invention. Referring to the loop of polarization of FIG. 2, the capacitance C of ferroelectric capacitor 10 is described by the slope of the curve. With no external field strength applied the capacitance is proportional to either the slope at the point 1 or 4 of FIG. 2, depending on the previous field strength history. For a given saturation field strength E at the point 3 or 6 of FIG. 2, the applied voltage V necessary to saturage the capacitor is equal to $(E_{SAT})$ $(d)$, where $d$ is the thickness of the ferroelectric. Conversely, a given voltage $V$ will only saturate a capacitor whose thickness $d$ is less than $V/E_{SAT}$. If $E_{SAT}$ is equal to a given value, as it would be for any given ferroelectric irrespective of its thickness, the above reduces to $d = k_1 V$. Recognizing this, if the capacitor was designed with an uneven thickness, as is the case in FIG. 1, it can be appreciated that those dielectric portions where $d$ is less than $k_1 V$ will have a field strength sufficient to saturate them. Conversely, those portions of the dielectric where $d$ is greater than $k_1 V$ the field strength will not be sufficient to saturate those portions.

FIG. 3 shows, in block diagram form, a record and playback system designed in accordance with this invention for recording and playing back digital information. As shown in this figure, the system comprises ferroelectric capacitor 10, a ramp generator 12, a signal source 14 (which is a digital signal source), a switch 15, a variable attenuator 16, and a summation circuit 21. Ramp generator 12 is connected to one of the inputs of the summation circuit 21. The output of the summation circuit 21 is connected to one of the plates of ferroelectric capacitor 10. Signal source 14 has one side connected to ground and the other side connected to one of the inputs to the summation circuit 21 through switch 15 and variable attenuator 16. The other plate of capacitor 10 is connected to ground. As will be apparent later, terminals 18 and 20 are playback terminals.

Figure 4A:
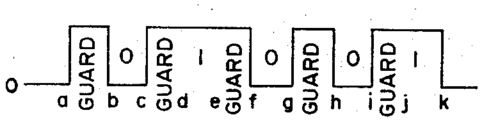
FIGS. 4A through 4E show wave diagrams for recording digital information using the system of FIG. 3.
Figure 4B:
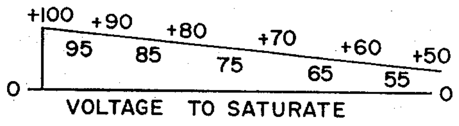
Figure 4C:
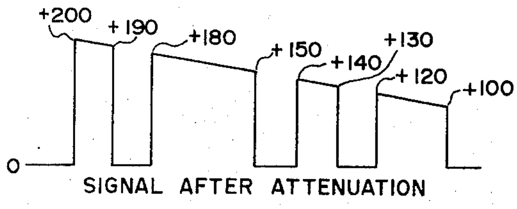
Figure 4D:
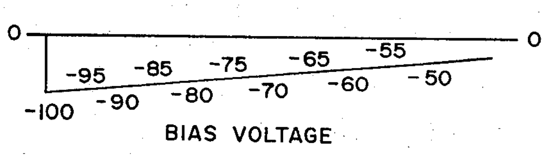
Figure 4E:
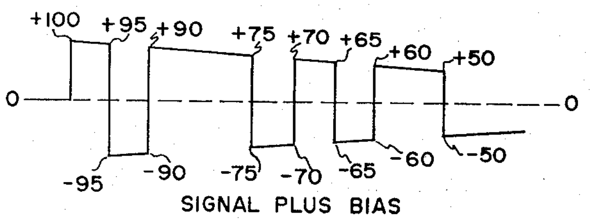

Recalling the general discussion above with reference to the saturation of ferroelectric capacitor 10, it should be apparent that ferroelectric capacitor 10 can be selectively polarized along its length by the proper combination of signal plus bias. The signals required for recording digital information with the system shown in FIG. 3 are shown in FIGS. 4A thru 4E. FIG. 4A shows a typical digital signal that is to be recorded. FIG. 4B shows the voltage required to saturate the ferroelectric capacitor at various points along the length of the capacitor. With the voltage value shown in FIG. 4B, it is assumed that ferroelectric capacitor 10 is so designed that it will saturate at its thicker portion with a voltage of 100 volts and at its thinner portion with a voltage of 50 volts. As indicated in FIG. 4B, the voltage required to saturate linearly decreases from the thickner end down toward the thinner, or decreases in steps from 100 volts down to 50 volts. FIG. 4C shows the signal of FIG. 4A after it has passed through variable attenuator 16. Variable attenuator 16 is so designed to attenuate the signal variably with time. That is, the attenuation increases as the length of the signal increases, as is obvious from FIG. 4C. FIG. 4D is the bias voltage applied to ferroelectric capacitor 10 in the system of FIG. 3. This is the output signal from ramp generator 12. The ramp voltage of FIG. 4D is essentially the ramp voltage of FIG. 4B with a sign reversal. That is, the ramp voltage of FIG. 4D increases from −100 volts to −50 volts. FIG. 4E shows the actual signal applied to ferroelectric capacitor 100 and is a combination of the signals of FIG. 4C plus the bias voltage of FIG. 4D. Since it is assumed above that ferroelectric capacitor 10 is so designed that it saturates at its thicker portion at 100 volts and its thinner portion at 50 volts, the signals and bias voltages are so chosen that the combined signal plus bias linearly decreases from a maximum of 100 volts down to a minimum of 50 volts.

FIGS. 5A, 5B, 5C, 5D and 5E depict the ferroelectric hysteresis loop along the capacitor, depicting it at different points from the thick end towards the thin end.

As has been mentioned above, the signal shown in FIG. 4A is the signal that is to be recorded with the system of FIG. 3. As illustrated, this signal is a series of five bits (01001). This message or signal is just arbitrarily chosen and any series of bits of digital information could be utilized. In recording these 1's and 0's, a "1" will be recorded as a fully positively polarized portion of the ferroelectric and a "0" will be recorded as a fully negatively polarized portion of the ferroelectric. Further, as shown in FIG. 4*a*, guard bands are provided between each bit. These guard bands will also be recorded as fully positively polarized portions of ferroelectric capacitor 10.

Figure 5A:
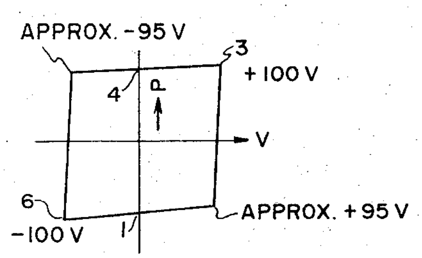
FIGS. 5A thru 5E are hysteresis diagrams useful in describing the operation of the circuitry of FIG. 3.

As shown in FIG. 4*a*, a guard band indicated as "guard" is recorded first. This is accomplished by applying a signal of 200 volts after attenuation in combination with a bias of −100 volts. This results in a positive signal of 100 volts at a which decreases to 95 volts at *b* since the signal after attenuation decreases from 200 volts to 190 volts while at the same time the bias voltage increases from −100 volts to −95 volts. At 100 volts ferroelectric capacitor 10 is entirely saturated. Referring to FIG. 5A as the signal moves from +100 volts to +95 volts, the loop will be traversed from position 3 to a position somewhat to the left and situated on the line 3–4. Accordingly, ferroelectric capacitor 10 is positively polarized.

Figures 5B, 5C:
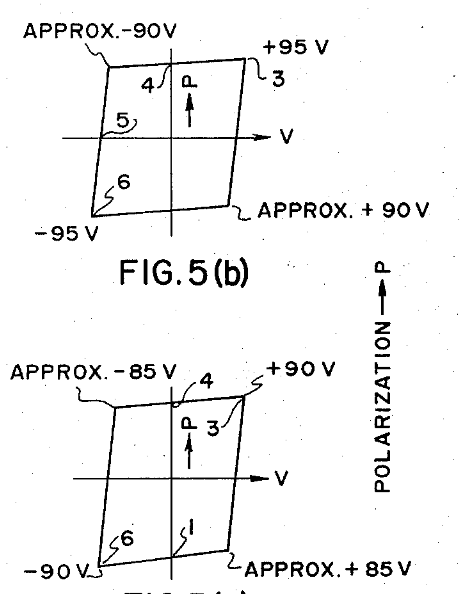
Figure 5D:
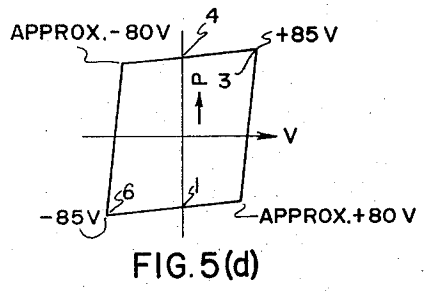

The next signal to be recorded is a "0" between *b–c* of FIG. 4A. As the bias voltage goes from −95 to −90 volts, the signal during this period of time is "0." Thus, the combined signal plus bias will go from +95 volts to −95 volts to −90 volts as shown in FIG. 4E. The first or second section of ferroelectric capacitor 10 as represented in FIG. 5A will not be affected, as it was previously positively polarized on line 3–4 and is moved by its combined signal plus bias along line 3–4. If that section had been polarized along line 6–1 the combined signal plus bias would have moved further along that very line. The polarization of the second section of ferroelectric capacitor 10 as represented in FIG. 5B moves from 3–4–5–6 to somewhat to the right of 6. Accordingly, this second portion of ferroelectric capacitor 10 and subsequent thinner portions are negatively polarized. The first portion, however, maintains its wanted positive polarization. The next signal to be recorded is the guard band *c–d* as shown in FIG. 4A. During this time the bias ramp is going from −90 volts to −85 volts as illustrated in FIG. 4G while the signal voltage is going from +180 volts to +170 volts as illustrated in FIG. 4C. Therefore, the combined signal plus bias will move from −90 volts to +90 volts to +85 volts as illustrated in FIG. 4E. In FIG. 5C the loop will be traversed from 6–1–3 to the left of 3 along the line 3–4. Accordingly, this portion of the ferroelectric is positively polarized. Thinner portions are also positively polarized but the first two portions maintain their wanted polarity since the strength of the combined signal plus bias is not sufficient to affect the polarity on these sections of ferroelectric capacitor 10.

The next bit to be recorded is a "1" at *d–e* as shown in FIG. 4A. During this time the bias is moving from −85 volts to −80 volts as shown in FIG. 4D while the signal is moving from +170 volts to +160 volts. Thus, the combined signal plus bias will move from +85 volts to +80 volts as shown in FIG. 4E. Accordingly, in FIG. 5D, the loop will be traversed from 3 to slightly to the left of 3 along the line 3–4. Thus, this portion of the ferroelectric is positively polarized. The first three portions however maintain their wanted polarity since again the combined signal plus bias is insufficient to disturb the thicker portion of ferroelectric capacitor 10.

Figure 5E:
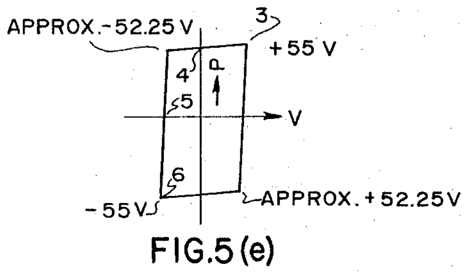

The balance of the recording is in the same fashion as described above and the voltages present to record the entire signal shown in FIG. 4A are shown in FIGS. 4C thru 4E. FIG. 5E shows the loop for the recording of the last bit $j-k$ of FIG. 4A or the loop for the thinner portion of ferroelectric capacitor 10.

Of course, now that the information has been stored on ferroelectric capacitor 10 of FIG. 3 utilizing the circuitry shown therein, some method must be provided for reading out the information stored on ferroelectric capacitor 10 if this stored information is to have utility. The general circuitry of FIG. 3 can also be used to readout the information. Signal source 14 is disconnected from the system by means of switch 15, and ramp generator 12 is operated to provide a bias voltage that starts at −50 volts and goes to −100 volts. The readout signal is obtained across terminals 18 and 20 using suitable conventional circuitry. The readout operates by noting the incremental capacitance as the bias voltage moves up in absolute value saturating ferroelectric capacitor 10 incrementally. In the recording, as described above, the readout works as follows: As the bias goes from −50 volts to −55 volts, the thinner sections of ferroelectric capacitor 10 which have been saturated positive during recording, as indicated in FIGS. 4A and 4E, traverses the loop in FIG. 5E and somewhat similar loops in adjacent materials from position 4–5–6. The output current during this traverse will be $i = C\ dv/dt + v\ dC/dt$ which consists of a current $Cdv/dt$ and a current $V\ dc/dt$. To demonstrate this relationship more clearly, assume the following values for the terms in the above equation: $C$ equals to 0.001 microfared along maximum slope line 5–6 in FIG. 5E for first section $kj$ as illustrated in FIG. 4A (and 0.000025 microfarads along minimum slope polarization line 3–4); $dv/dt$ equals 10 volts/millisecond; $v$ equals −50 to −55 volts during this first playback interval; and $dc/dt$ equals zero except for the intervals it is transitioning from a near horizontal polarization line such as 3–4 (FIG. 5E) to the near vertical polarization line 5–6. The spikes during this transition can be filtered out and thus can be disregarded. Taking the above values, the output current then equals (0.001) (10−6) (10/001) equals 5 microamperes for maximum slope (and $dcv/dt$ equals (0.000025) 10/0.001 which equals 0.125 microamperes, if ij were a minimum slope. The 5 microamperes corresponds to a logic "1." If a one megohm resistor were connected across terminals 18 and 20 of FIG. 3, the output voltage would be 5 volts. Thus, a 5 volt output represents a logic "1" output. Since the thicker sections (i.e., sections $ji$, $ih$, $hg$, etc. as illustrated in FIG. 4A) require more than the −50 to −55 volts to switch their operating point on the polarization loop, these thicker portions are not effected by this applied voltage.

As the bias goes from −55 to −60 volts the next section which has been saturated positive during recording to represent a guard band, the output would again be 5 volts across a 1 megohm resistor or a current output of 5 microamperes which in the recording sample given above represents a logic "1" or a guard band and since this output was preceded by a logic "1," it represents a guard band. The previous section which is already saturated negative from the readout of this section is unaffected by the −55 to −60 volts. The following sections require a larger negative voltage than −60 volts to change their state; they are unaffected.

As the bias now goes from −60 to −65 volts the next section will be readout. As illustrated in FIG. 4A this section has a "0" stored therein. This section of ferroelectric capacitor 10 is therefore saturated negative during the recording process. The varying output current for this section will be $C\ dv/dt$ where $C$ has an average value of 0.000025 microfarads and $dv/dt$ equals 10 volts per millisecond, along the small slope of the portion of the hysteresis curve corresponding to, for example, 6 to 1 in FIG. 5C. The actual polarization loop for this section of ferroelectric capacitor 10 is not shown in the drawing. The output current is 0.125 microamperes. The output voltage then would be 0.125 volts across a 1 megohm resistor. This corresponds to a logic "0." In a similar fashion, the rest of the ferroelectric can be readout.

From the foregoing discussion of the recording and readout, it should be apparent that the signal obtained during readout is a reversal of the signal recorded. Referring again to FIG. 4A, the signal was recorded going from section $a-b$ to finally section $j-k$. During the readout process the signals were readout starting with $k-j$ down to $b-a$. In the recording of digital information this does not present a problem and the information can be readily put in proper order. Further, it should be obvious from the above discussion that the readout of ferroelectric capacitor 10 is destructive. That is, when the information is readout it is no longer stored on ferroelectric capacitor 10. Ferroelectric capacitor 10 is then ready for the receipt of different information. This, of course, means that information once readout is no longer available for future readout. This, of course, means that without some additional provision the recording and playback systems of this invention do not provide, in effect, permanent storage that can be readout repeatedly. This problem is, however, easily overcome by providing a second system similar to the system shown in FIG. 3. In this second system, the readout signal appearing across terminals 18 and 20 is used as the signal source for the second system. Thus, the information will be stored on a second ferroelectric capacitor. It is interesting to note that the storage on this second capacitor is such that when the information is readout from this capacitor, the information will be in the same order as initially recorded. If at some future time one desires to readout the information from the second storage device utilized as described above, ferroelectric capacitor 10 of FIG. 3 could be utilized to again store this information so that a permanent record will always be maintained.

Figure 6:
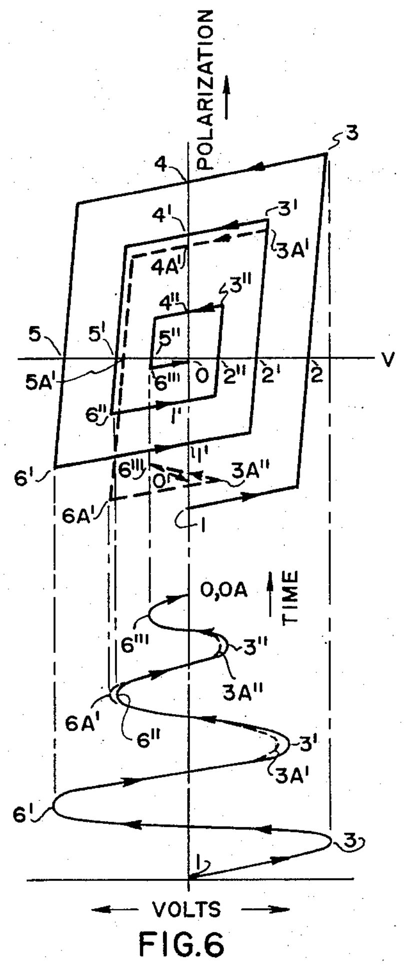
FIG. 6 illustrates the polarization effects of a decreasing sinusoidal bias applied to the storage device of FIG. 1.
Figure 8:
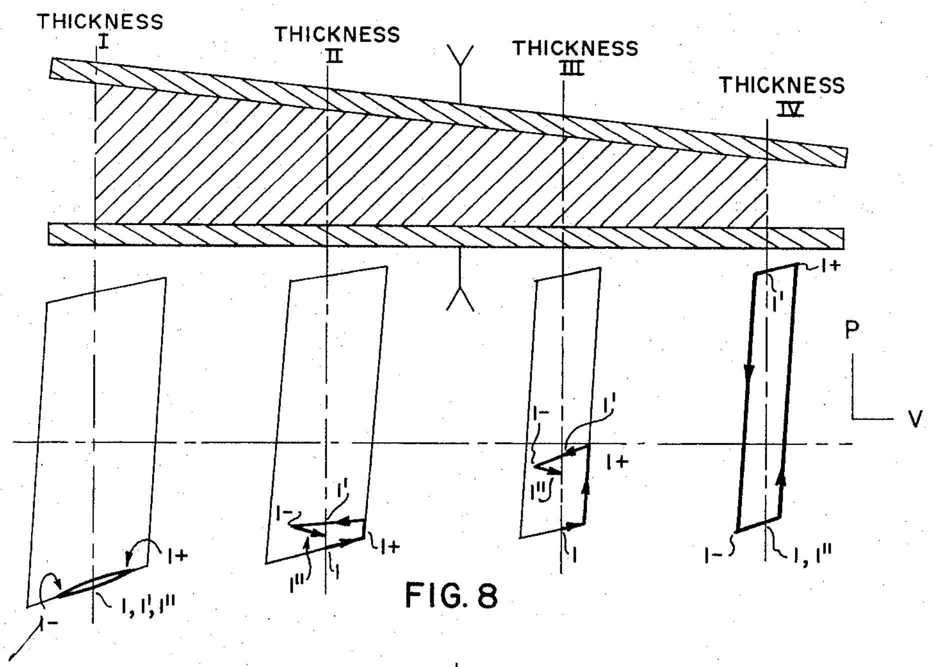
FIG. 8 shows hysteresis loops useful in describing the effects of an analog signal on the storage device of FIG. 1.

While the invention has been described to this point with reference to the storage and readout of digital signals, voice signals can also be recorded with recording and playback devices designed in accordance with this invention. The recording of voice signals can be accomplished by using a high frequency AC plus a DC bias voltage both decreasing linearly with time instead of only the DC ramp decreasing linearly with time. Before specifically discussing the recording of voice signals on ferroelectric capacitor 10, some general observations of the recording of such signals will first be given. Referring to FIG. 6, if ferroelectric capacitor 10 is subjected to a decreasing bias in the form of only a sinusoidal field as shown in FIG. 6, all its domains will be brought to a minimum remnant polarization. They can attain this remnant polarization by moving successively, as shown in FIG. 6, say, 1–2–3–4–5–6′–1′–2′–3′–4′–5′–6″—0. Thus, there is no recording of the bias field alone, unless it is considered to be a zero amplitude signal. If a signal offset by a DC voltage to assure only negative polarity is now added to the bias such as between 3A′ and 3A″ in FIG. 6, it can offset the combined signal plus bias resulting in there being a remnant polarization at point 0′ at zero voltage. FIG. 8 shows the effects of such a signal on different thicknesses of ferroelectric capacitor wedge 10, at one moment of time. Typically, the domains in the ferroelectric material at thickness I, as represented by the associated hysteresis loop, will not be altered by a given and sufficiently small signal plus bias. This combined signal plus bias will describe the loop 1, 1+, 1′, 1−, 1″. Thus, there is no alteration of the remnant polarization of this thickness of material.

The domains of the ferroelectric material in thickness II as represented by its associated loop will be altered to a slight degree describing the loop, 1, 1+, 1′, 1−, and ending up at 1″. This slight alteration might cause some distortion to a replayed signal and therefore it is important that a ferroelectric material with as square a hysteresis loop as possible be used. Such a ferroelectric material would minimize such distortion.

The domains in the ferroelectric material at thickness III as represented by its associated loop will be maximally affected by this assumed signal plus bias. It will describe the loop 1, 1+, 1′, 1−, and end up at 1″. This represents a maximum alteration in remnant polarization. The value of the signal plus bias has, of course, been assumed to be, during this preceding discussion, of such value that the various loops shown in FIG. 8 will, in fact, be typical loops. Any stronger or any weaker signal plus bias would effect various areas of ferroelectric capacitor 10 in a different manner.

Finally, referring to thickness IV as shown in FIG. 8, this portion, as illustrated by its associated loop, will be swung into and out of saturation by the assumed signal plus bias and is not therefore affected by the signal.

Figure 7:
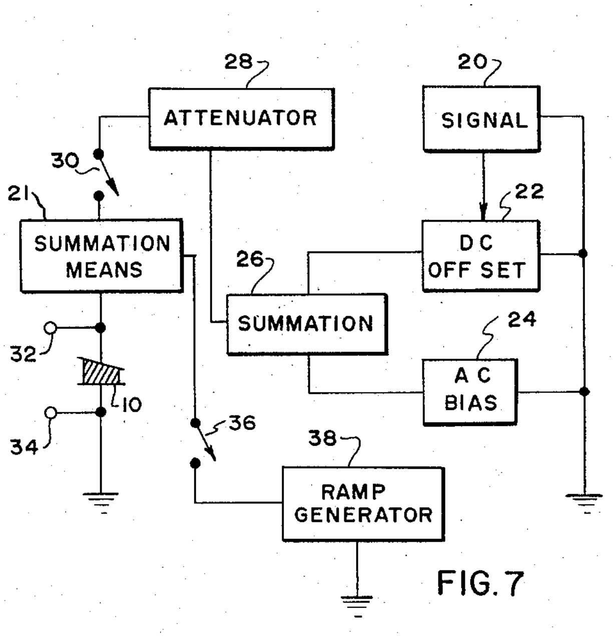
FIG. 7 shows a recording and playback system designed in accordance with this invention for recording and playing back analog signals.

Now that some general observations have been made about recording speech signals, attention is directed to FIG. 7 which shows a recording and playback device designed in accordance with this invention for recording and playing back voice signals. As shown in FIG. 7, the system comprises ferroelectric capacitor 10, an attenuator 28 connected through a switch 30 to summation circuit 21, whose output is connected to one plate of ferroelectric capacitor 10, a summation circuit 26 having its output connected to attenuator 28, an AC bias source connected between summation circuit 26 and ground, a DC offset voltage connected between summation circuit 26 and ground, a signal source connected between ground and DC offset voltage source 22, and a ramp generator 38 connected through switch 36 to the summation circuit 21. The terminals 32 and 34 are utilized to obtain a readout signal from ferroelectric capacitor 10. In the record mode switch 30 is closed with switch 36 open.

Figure 9A:
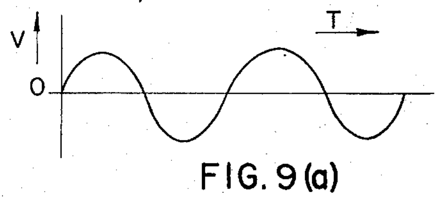
FIGS. 9A thru 9D are wave forms utilized to record an analog signal with the system of FIG. 7.
Figure 9B:
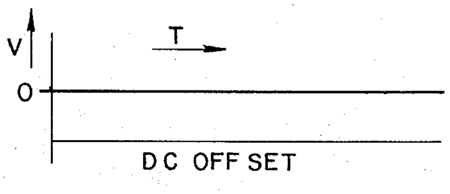
Figure 9C:
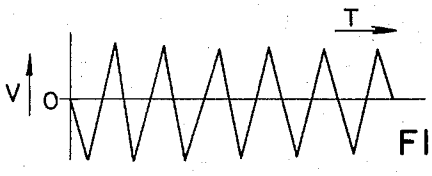
Figure 9D:
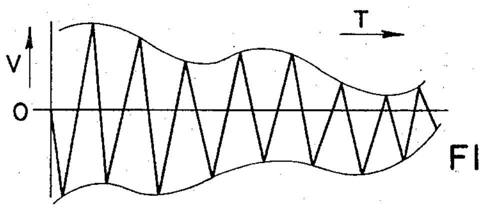
Figure 10A:
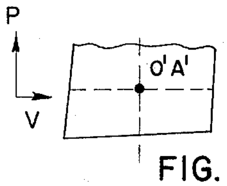
FIGS. 10A thru 10D are partial hysteresis loops showing the effect of applying the signals of 9A thru 9D to the storage device of FIG. 1.
Figure 10B:
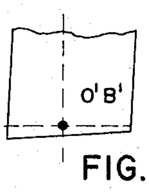
Figure 10C:
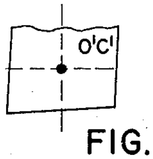
Figure 10D:
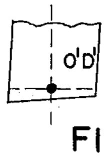
Figure 11A:
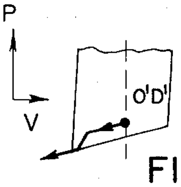
FIGS. 11A thru 11D are partial hysteresis loops useful in describing the playback operation of the system of FIG. 7.
Figure 11B:
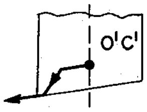
Figure 11C:
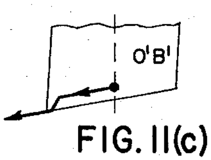
Figure 11D:
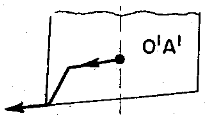

FIGS. 9A thru 9D illustrate the wave forms present at various points in the circuitry of FIG. 7. FIG. 9A is the input signal, FIG. 9B is the DC offset voltage, FIG. 9C is the AC bias and FIG. 9D is the signal appearing at the output of attenuator 28 and therefore the signal applied during recording to ferroelectric capacitor 10. As illustrated in these figures, the input signal 9A is offset by the DC offset voltage shown in 9B. This offset signal is then summed with the AC bias signal shown in FIG. 9C and this summed signal is then attenuated to obtain the signal shown in FIG. 9D. Attenuator 28 is provided to assure that the signal plus bias will decrease linearly so that information stored on the thicker portions of ferroelectric capacitor 10 will not be altered by subsequent signals. Thus, attenuator 28 like attenuator 16 of FIG. 3 attenuates the composite signal linearly with time.

FIGS. 10A thru 10D illustrate the domains at different thicknesses of ferroelectric capacitor 10 after recording. These figures actually illustate a portion or cut-off polarization loop. The entire loops would be similar to the loops shown in FIGS. 5A thru 5E. The entire loop is not given since it is not necessary for an understanding of the operation of the circuitry of FIG. 7. As shown in FIGS. 10A thru 10D, the remnant polarization from the thickest to the thinnest portions along ferroelectric capacitor 10 are shown at points 0′A′, 0′B′, 0′C′, and 0′D′, respectively. These remnant polarizations represent the speech input signal illustrated in FIG. 9A.

FIGS. 11A thru 11D illustrate the domains commencing with the thin end of ferroelectric capacitor 10 and terminating with the thick end thereof during the playback process. During the record process, the switch 30 was in its closed position. During the playback process, switch 30 is open and switch 36 is closed. Thus, ramp generator 38 is applied to ferroelectric capacitor 10 during the playback process. Ramp generator 38 provides an ascending DC voltage ramp during the playback process. This ascending DC voltage ramp will alter the polarization or position of the ferroelectric domain towards saturation, selectively from the thin end toward the thick end as time/voltage increases. In so doing, a current $I$ will flow proportional to $C$, the incremental capacitance, where the current will equal $C\,dv/dt$. The gain of an external amplifier will have to be increased linearly with ramp voltage so as to compensate for the decreasing gain of the recording process. The polarization loops of FIGS. 11A thru 11D illustrate the domains at different thickness along ferroelectric capacitor 10 commencing with the thin end of the ferroelectric and terminating with the thick end. These loops illustrate the playback process and as is apparent from the drawings, the loops of FIGS. 10A thru 10D and 11A thru 11D are the exact reverse.

Figure 12:
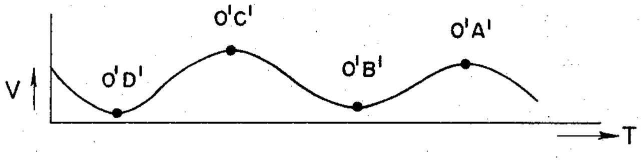
FIG. 12 shows the signal of FIG. 9A during the playback process.

The signal during playback, as was the case in the digital recording system described above, is reversed during the playback process. This is illustrated by the comparison of the loops of FIGS. 10A thru 10D and 11A thru 11D and is illustrated by comparing the wave form shown in FIG. 12 with the wave form shown in FIG. 9A. The wave form of FIG. 9A being the input signal and the wave form of FIG. 12 being the output signal.

This reversal of signal order can, of course, not be tolerated where speech signals are recorded since the speech signals as readout would be essentially unintelligible. This problem is, however, easily resolved by first reading out the signals from ferroelectric capacitor 10 of FIG. 7 and recording these signals as readout on a second ferroelectric capacitor 10. The second ferroelectric capacitor will be the storage medium of a system similar to the system of FIG. 7. In fact, the system will be identical except that signal source 20 of FIG. 7 will be the readout signal from the first ferroelectric capacitor. After the signals have been totally readout from the first ferroelectric capacitor, and stored on the second ferroelectric capacitor, the signals can be readout from the second ferroelectric capacitor and will be readout in proper sequence. Thus, the speech signals will be readily intelligible signals.

As was the case in the digital recording, the readout of speech signals is also destructive. However, this again can be avoided by so designing the system so that the signals are always recorded on a secondary or second storage medium while they are being readout. In this manner signals are always stored while being readout and therefore a permanent record can be maintained.

From the foregoing detailed description it should be obvious that this invention provides a recording and playback system that has general utility without some of the attendant disadvantages of the prior art devices. For example, in autocorrelation or crosscorrelation signal processing devices, this invention can replace many present type memory units such as magnetic cores, ferroelectric matrices, phonographic records or magnetic tapes. Use of this invention for such signal processing would decrease cost, size and weight, and would eliminate completely any motors, magnets or other mechanical parts. Further, this invention can be used as a voice recorder useable under extreme environmental conditions without deleterious effect on the storage medium, and in voice recording can be used to provide a cryptographic recording since prior knowledge of the bias variation would be necessary to successfully readout the message.

These above noted uses are not to be considered as uses to which this invention is limited since the invention has general utility in the storage device field. Those skilled in the art will immediately recognize its general utility and will think of many different applications for this invention.

While the invention has been specifically described with reference to the use of a ferroelectric capacitor as the storage medium, it is again emphasized that this ferroelectric capacitor can be replaced with a similar saturable ferromagnetic reactor. Further, while particular circuitry has been shown for recording and playing back signals in accordance with this invention, it will be obvious to those skilled in the art that various different types of well known circuitry could be utilized to obtain the necessary signals for recording and playback. The important points being that signals of the nature described must be applied to the ferroelectric capacitor or saturable ferromagnetic reactor to properly record and playback signals from these devices. Further, it will be obvious to those skilled in the art that various changes and modifications can be made to the embodiments described without departing from the spirit and scope of the invention as defined in the appended claims.

What is claimed is:

1. A recording system comprising a solid state storage means including at least one body of saturable material having a variable substantially rectangular hysteresis loop saturation characteristic and adapted to saturate at different electrical energization levels at different cross section points on a transverse axis through said body between first and second surface points, said body adapted to saturate at a relatively high electrical energization level in the vicinity of said first surface point and to saturate at progressively lesser electrical energization levels at points on said transverse axis spaced from said first surface point with the lowest energization level to saturate said body in the vicinity of said second surface point;

electrical energization means having an output substantially sufficient to saturate said body in the vicinity of said first surface point on said transverse axis, the output of said energization means electrically connected across said body in substantially orthogonal relation with respect said transverse axis;

information signal means adapted to decrease the output of said electrical energization means in accordance with input information at selected cross section points progressively distant from said first surface point on said transverse axis such that said input information is stored in defined increments at respective selected cross section points;

and means for connecting readout means across said body of saturable material;

wherein said body of saturable material comprises at least one ferroelectric capacitor means and said ferroelectric capacitor means has a dielectric of nonuniform cross section with conductive plates on opposing sides of said dielectric;

wherein said dielectric is wedge shaped and said plates of said ferroelectric capacitor means are also wedge shaped;

wherein said electrical energization means includes the following:

a first dual input signal summation means electrically connected across said body of saturable material, a ramp generator means adapted to produce an output signal with a magnitude decreasing linearly with time; plus, means connecting the output of said ramp generator means to one input of said first dual input signal summation means;

wherein said information signal means includes;

second dual input signal summation means, audio information signal source means having an amplitude modulated output with a selected maximum peak amplitude, offset voltage source means electrically connecting the output of said audio information signal source means to one input of said second dual input signal summation means, said offset voltage source having a DC output voltage of selected magnitude at least as great as said maximum peak amplitude of said audio information signal source, bias signal means having an AC voltage output, and means connecting the output of said bias signal means to the other input of said second dual input signal summation means;

and wherein said information signal means also includes variable attenuator means connecting the output of said second dual input summation means to the other input of said first dual signal summation means such that by selective adjustment of said variable attentuator, information may be stored at selected cross section points on said transverse axis.

2. A recording system comprising a solid state storage means including at least one body of saturable material having a variable substantially rectangular hysteresis loop saturation characteristic and adapted to saturate at different electrical energization levels at different cross section points on a transverse axis through said body between first and second surface points, said body adapted to saturate at a relatively high electrical energization level in the vicinity of said first surface point and to saturate at progressively lesser electrical energization levels at points on said transverse axis spaced from said first surface point with the lowest energization level to saturate said body in the vicinity of said second surface point;

electrical energization means having an output substantially sufficient to saturate said body in the vicinity of said first surface point on said transverse axis, the output of said energization means electrically connected across said body in substantially orthogonal relation with respect said transverse axis;

information signal means adapted to decrease the output of said electrical energization means in accordance with input information at selected cross section points progressively distant from said first surface point on said transverse axis such that said input information is stored in defined increments at respective selected cross section points;

and means for connecting readout means across said body of saturable material;

wherein said body of saturable material comprises at least one ferromagnetic reactor means having a saturable core of nonuniform cross section;

wherein said information is stored in defined increments along the length of said body at said cross section points on said transverse axis through said body of said ferromagnetic reactor means;

and wherein said electrical energization means includes the following:

a dual input signal summation means electrically connected across said body of saturable material, a ramp generator means adapted to produce an output signal with a magnitude decreasing linearly with time; plus, and means connecting the output of said ramp generator means to one input of said dual input signal summation means;

and wherein said information signal means includes;

a digital signal source and means including variable attentuator means connecting the output of said digital signal source to the other input of said dual input signal summation means, said variable attentuator adapted to respond to input information and to apply the output of said digital source to said signal summation means.

3. A recording system comprising a solid state storage means including at least one body of saturable material having a variable substantially rectangular hysteresis loop saturation characteristic and adapted to saturate at different electrical energization levels at different cross section points on a transverse axis through said body between first and second surface points, said body adapted to saturate at a relatively high electrical energization level in the vicinity of said first surface point and to saturate at progressively lesser electrical energization levels at points on said transverse axis spaced from said first surface point with the lowest energization level to saturate said body in the vicinity of said second surface point;

electrical energization means having an output substantially sufficient to saturate said body in the vicinity of said first surface point on said transverse axis, the output of said energization means electrically connected across said body in substantially orthogonal relation with respect said transverse axis;

information signal means adapted to decrease the output of said electrical energization means in accordance with input information at selected cross section points progressively distant from said first surface point on said transverse axis such that said input information is stored in defined increments at respective selected cross section points;

and means for connecting readout means across said body of saturable material;

wherein said body of saturable material comprises at least one ferromagnetic reactor means having a saturable core of nonuniform cross section;

and wherein said electrical energization means includes the following:

a first dual input signal summation means electrically connected across said body of saturable material, a ramp generator means adapted to produce an output signal with a magnitude decreasing linearly with time; plus, means connecting the output of said ramp generator means to one input of said first dual input signal summation means;

and wherein said information signal means includes;

second dual input signal summation means, audio information signal source means having an amplitude modulated output with a selected maximum peak amplitude, offset voltage source means electrically connecting the output of said audio information signal source means to one input of said second dual input signal summation means, said offset voltage source having a DC output voltage of selected magnitude at least as great as said maximum peak amplitude of said audio information signal source, bias signal means having an AC voltage output, and means connecting the output of said bias signal means to the other input of said second dual input signal summation means;

and wherein said information signal means also includes variable attenuator means connecting the output of said second dual input summation means to the other input of said first dual signal summation means such that by selective adjustment of said variable attentuator, information may be stored at selected cross section points on said transverse axis.

4. A recording system comprising a solid state storage means including at least one body of saturable material having a variable substantially rectangular hysteresis loop saturation characteristic and adapted to saturate at different electrical energization levels at different cross section points on a transverse axis through said body between first and second surface points, said body adapted to saturate at a relatively high electrical energization level in the vicinity of said first surface point and to saturate at progressively lesser electrical energization levels at points on said transverse axis spaced from said first surface point with the lowest energization level to saturate said body in the vicinity of said second surface point;

electrical energization means having an output substantially sufficient to saturate said body in the vicinity of said first surface point on said transverse axis, the output of said energization means electrically connected across said body in substantially orthogonal relation with respect said transverse axis;

information signal means adapted to decrease the output of said electrical energization means in accordance with input information at selected cross section points progressively distant from said first surface point on said transverse axis such that said input information is stored in defined increments at respective selected cross section points;

and means for connecting readout means across said body of saturable material;

wherein said body of saturable material comprises at least one ferroelectric capacitor means and said ferroelectric capacitor means has a dielectric of nonuniform cross section with conductive plates on opposing sides of said dielectric;

wherein said dielectric is wedge shaped and said plates of said ferroelectric capacitor means are also wedge shaped;

and wherein said electrical energization means includes the following:

a dual input signal summation means electrically connected across said body of saturable material, a ramp generator means adapted to produce at least one output signal with a magnitude decreasing linearly with time plus, and means connecting the output of said ramp generator means to one input of said dual input signal summation means;

and wherein said information signal means includes;

a digital signal source, having a pulse train output, and means including variable attentuator means connecting the output of said digital signal source to the other input of said dual input signal summation means, said variable attentuator adapted to respond to input information and to apply the output of said digital signal source to said signal summation means, said dual input signal summation means adapted to apply the output signal of said ramp generator means across said body of saturable material in digital form in accordance with the pulse train output of said digital signal source.

5. A recording system as defined in claim 4 wherein said ramp generator means is adapted to produce a positive output signal with a magnitude decreasing linearly with time and a negative output signal with a magnitude decreasing linearly with time, concurrently;

and said dual input signal summation means is adapted to apply the output signals of said ramp generator in a selected order.

6. A recording system as defined in claim 5 wherein said dual input signal summation means is adapted to apply the output signals of said ramp generator in alternate order.

* * * * *